(12) United States Patent
Low et al.

(10) Patent No.: US 10,997,337 B2
(45) Date of Patent: May 4, 2021

(54) TRADING T-GATES FOR QUBITS IN ARBITRARY STATE AND UNITARY SYNTHESIS

(71) Applicant: Microsoft Technology Licensing, LLC, Redmond, WA (US)

(72) Inventors: Guang Hao Low, Redmond, WA (US); Vadym Kliuchnikov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/439,531

(22) Filed: Jun. 12, 2019

(65) Prior Publication Data
US 2020/0134107 A1    Apr. 30, 2020

Related U.S. Application Data

(60) Provisional application No. 62/752,887, filed on Oct. 30, 2018.

(51) Int. Cl.
| | |
|---|---|
| G06F 30/327 | (2020.01) |
| G06F 111/10 | (2020.01) |
| G06N 10/00 | (2019.01) |

(52) U.S. Cl.
CPC ........... *G06F 30/327* (2020.01); *G06N 10/00* (2019.01); *G06F 2111/10* (2020.01)

(58) Field of Classification Search
CPC .... G06F 30/327; G06F 2111/10; G06N 10/00
See application file for complete search history.

(56) References Cited

U.S. PATENT DOCUMENTS

| | | | |
|---|---|---|---|
| 10,248,491 B1 * | 4/2019 | Zeng | G06N 10/00 |
| 2018/0039903 A1 * | 2/2018 | Mosca | G06N 10/00 |
| 2019/0018912 A1 * | 1/2019 | Mosca | G06N 10/00 |

OTHER PUBLICATIONS

Aaronson, "The Complexity of Quantum States and Transformations: From Quantum Money to Black Holes," *Lecture Notes for the 28th McGill Invitational Workshop on Computational Complexity*, 111 pp. (Jul. 2016).

(Continued)

*Primary Examiner* — Vuthe Siek
(74) *Attorney, Agent, or Firm* — Klarquist Sparkman, LLP

(57) ABSTRACT

Efficient synthesis of arbitrary quantum states and unitaries from a universal fault tolerant gate-set (e.g., Clifford+T) is a goal in quantum computation. As physical quantum computers are fixed in size, all available qubits should be used if it minimizes overall gate counts, especially that of the expensive T-gates. In this application, a quantum algorithm is described for preparing any dimension-N quantum state specified by a list of N classical numbers, that realizes a trade-off between space and T-gates. Example embodiments exploit $\mathcal{O}(\lambda)$ ancilla qubits, to reduce the T-gate cost to $$\mathcal{O}\left(\frac{N}{\lambda} + \lambda \log^2 \frac{N}{\epsilon}\right).$$

Notably, this it proven to be optimal up to logarithmic factors for any $\lambda = o(\sqrt{N})$ through an unconditional gate counting argument. Though $\tilde{\mathcal{O}}(N)$ Clifford gates are always required, only $\tilde{\mathcal{O}}(\sqrt{N})$ T-gates are needed in the best case, which is a quadratic improvement over prior art. Similar statements are provien for unitary synthesis by reduction to state preparation.

17 Claims, 7 Drawing Sheets

(56) References Cited

OTHER PUBLICATIONS

Aharonov et al., "Adiabatic Quantum State Generation and Statistical Zero Knowledge," *Proc. ACM Symp. on Theory of Computing*, pp. 20-29 (Jun. 2003).
Babbush et al., "Quantum Simulation of Chemistry with Sublinear Scaling to the Continuum," arXiv:1807.09802v1, 8 pp. (Jul. 25, 2018).
Babbush et al., "Encoding Electronic Spectra in Quantum Circuits with Linear T Complexity," arXiv:1805.03662v2, 39 pp. (Sep. 19, 2018).
Berry et al., "Simulating Hamiltonian dynamics with a truncated Taylor series," arXiv:1412.4687v1, 5 pp. (Dec. 15, 2014).
Bravyi et al., "Improved classical simulation of quantum circuits dominated by Clifford gates," arXiv:1601.07601v3, 20 pp. (Apr. 9, 2019).
Childs et al., "Toward the first quantum simulation with quantum speedup," *Proc. National Academy of Sciences*, 115:9456-9461 (Sep. 18, 2018).
Cuccaro et al., "A new quantum ripple-carry addition circuit," arXiv:quant-ph/0410184v1, 9 pp. (Oct. 22, 2004).
Gidney, "Halving the cost of quantum addition," arXiv:1709.06648v3, 6 pp. (Jun. 13, 2018).
Gosset et al., "An Algorithm for the T-count," *Quantum Information and Computation*, 14:1261-1276 (Nov. 2014).
Grover, "A fast quantum mechanical algorithm for database search," *Proc. ACM Symp. on Theory of Computing*, 8 pp. (May 1996).
Grover et al., "Creating superpositions that correspond to efficiently integrable probability distributions," arXiv:quant-ph/0208112v1, 2 pp. (Aug. 15, 2002).
Harrow et al., "Efficient Discrete Approximations of Quantum Gates," arXiv:quant-ph/0111031v3, 7 pp. (Jul. 11, 2002).
Harrow et al., "Quantum algorithm for linear systems of equations," *Physical Review Letters*, 103:1-24 (Oct. 2009).
Hastings et al., "Distillation with sublogarithmic overhead," arXiv:1709.03543v2, 2 pp. (Sep. 13, 2017).
International Search Report and Written Opinion dated Feb. 27, 2020, from International Patent Application No. PCT/US2019/058906, 14 pp.
Kliuchnikov et al., "Asymptotically optimal approximation of single qubit unitaries by Clifford and T circuits using a constant number of ancillary qubits," arXiv:1212.0822v2, 5 pp. (Dec. 6, 2012).
Lloyd et al., "Quantum principal component analysis," *Nature Physics*, 10:631-633 (Jul. 27, 2014).
Low et al., "Optimal Hamiltonian Simulation by Quantum Signal Processing," *Physical Review Letters*, 118:010501-1-010501-5 (Jan. 6, 2017).
Low et al., "Trading T-gates for dirty qubits in state preparation and unitary synthesis," arXiv:1812.00954v1, 11 pp. (Dec. 3, 2018).
Mora et al., "Algorithmic complexity and entanglement of quantum states," arXiv:quant-ph/0505200v2, 4 pp. (Aug. 3, 2006).
Nielsen et al., *Quantum Computation and Quantum Information*, Cambridge University Press, 704 pp. (2010).
Prakash, "Quantum Algorithms for Linear Algebra and Machine Learning," Ph.D. Thesis, University of California, Berkeley, 91 pp. (Dec. 9, 2014).
Ross, "Optimal ancilla-free Clifford+V approximation of z-rotations," arXiv:1409.4355v2, 14 pp. (Mar. 6, 2015).
Shende et al., "Synthesis of Quantum Logic Circuits," *IEEE Trans. on Computer-Aided Design of Integrated Circuits and Systems*, 25, 4 pp. (Jun. 2006).
Welch et al., "Efficient Approximation of Diagonal Unitaries over the Clifford+T Basis," arXiv:1412.5608v4, 18 pp. (Nov. 18, 2015).
Wiebe et al., "Quantum Algorithm for Data Fitting," *Physical Review Letters*, 109:050505-1-050505-5 (Aug. 3, 2012).
Wossnig et al., "A quantum linear system algorithm for dense matrices," arXiv:1704.06174v1, 6 pp. (Apr. 20, 2017).

\* cited by examiner

US 10,997,337 B2
TRADING T-GATES FOR QUBITS IN ARBITRARY STATE AND UNITARY SYNTHESIS

CROSS-REFERENCE TO RELATED APPLICATIONS

This application claims the benefit of U.S. Provisional Application No. 62/752,887 entitled "TRADING T-GATES FOR QUBITS IN ARBITRARY STATE AND UNITARY SYNTHESIS" and filed on Oct. 30, 2018, which is hereby incorporated herein by reference in its entirety.

FIELD

This application relates to quantum computing. In particular, this application relates to tools and techniques for trading T-gates for qubits in an arbitrary state and unitary synthesis.

SUMMARY

Efficient synthesis of arbitrary quantum states and unitaries from a universal fault-tolerant gate-set (e.g., Clifford+T) is a goal in quantum computation. As physical quantum computers are fixed in size, all available qubits should be used if it minimizes overall gate counts, especially that of the expensive T-gates. In this application, a quantum algorithm is described for preparing any dimension-N quantum state specified by a list of N classical numbers, that realizes a trade-off between space and T-gates. Example embodiments exploit $\mathcal{O}(\lambda)$ ancilla qubits, to reduce the T-gate cost to $$\mathcal{O}\left(\frac{N}{\lambda} + \lambda \log^2 \frac{N}{\epsilon}\right).$$

Notably, this is proven to be optimal up to logarithmic factors for any $\lambda = o(\sqrt{N})$ through an unconditional gate counting argument. Though $\mathcal{O}(N)$ Clifford gates are always required, only $\mathcal{O}(\sqrt{N})$ T-gates are needed in the best case, which is a quadratic improvement over prior art. Similar statements are provien for unitary synthesis by reduction to state preparation.

In certain embodiments, a quantum algorithm description is input (e.g., into a classical computer). The quantum algorithm description is synthesized into a synthesized quantum circuit representation (e.g., using the classical computer and using an appropriate compilation/synthesis tool for quantum computing). In the illustrated embodiment, the quantum circuit representation is implementable on a quantum computing device, and the synthesizing comprises assigning one or more ancilla qubits to be used for at least one non-Clifford operation. The synthesized quantum circuit representation is output (e.g., the synthesized quantum circuit representation is a set of low-level machine instructions for .implementation on a quantum device).

Any of the disclosed embodiments can be implemented by one or more computer-readable media storing computer-executable instructions, which when executed by a computer cause the computer to perform any of the disclosed methods. Also disclosed herein are systems for performing embodiments of the disclosed embodiments comprising a classical computer configured to program, control, and/or measure a quantum computing device. The foregoing and other objects, features, and advantages of the disclosed technology will become more apparent from the following detailed description, which proceeds with reference to the accompanying figures.

DETAILED DESCRIPTION

I. General Considerations

As used in this application, the singular forms "a," "an," and "the" include the :plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary the art.

II. Introduction

Many real-world applications of quantum algorithms rely on the input of classical data into a quantum system. It is often the case where achieving quantum speedups uses the ability to coherently access classical data in superposition. Examples where this is a useful step include machine learning, simulation of physical systems, solving systems of linear equations, data regression, and sampling.

The central challenge is synthesizing some arbitrary unitary $A \in \mathbb{C}^{N \times N}$ specified by a list of $N^2$ complex coefficients. In any scalable approach to quantum computation, unitaries are desirably expressed in terms of a universal fault-tolerant quantum gate set, such as Clifford gates {H, S, $C_{NOT}$} and T gates. Also of interest is synthesizing any unitary that prepares an arbitrary quantum state $A|0\rangle = |\psi\rangle$ of dimension: N—a special case also of interest. This state is similarly specified by N coefficients $\vec{a} \in \mathbb{C}^N$ that are completely arbitrary.

Solovay and Kitaev were the first to recognize that any single-qubit unitary could be $\epsilon$-approximated using $\mathcal{O}(\log^c(1/\epsilon))$ (for c=3.97) fault-tolerant gates. See M. A. Nielsen and I. L. Chuang, Quantum Computation and Quantum Information, 1st ed. (Cambridge University Press, 2004). Through a series of work, this has since been improved to an optimal c=1. See, e.g., V. Kliuchnikov, D. Maslov, and M. Mosca, Phys. Rev. Lett. 110, 190502 (2013); N. J. Ross, Quantum Info. Comput. 15, 932 (2015). By bootstrapping these results, it is known that without any ancilla qubits, $\mathcal{O}(N^{\{1,2\}} \log(N/\epsilon))$ gates suffice to synthesize any {quantum state, unitary}. Though early approaches exploit ancilla qubits for the N=2 case, these only achieve constant factor improvements. See V. Kliuchnikov, B. Maslov, and M. Mosca, Phys. Rev. Lett. 110, 190502 (2013). Through gate-counting arguments (see, e.g., A. W. Harrow, B. Recht, and I. L. Chuang, Journal of Mathematical Physics 43, 4445 (2002), https://doi.org/10.1063/1.1495899), the dimension scaling and log (1/$\epsilon$) factor appears optimal. Thus it appears there is nothing new to discover. All that remains is more and more precise constant factors.

However, not all fault-tolerant quantum gates are equal. It is now understood that fault-tolerant Clifford gates {H, S, $C_{NOT}$} are generally cheap. In contrast, fault-tolerant non-Clifford T gates are incredibly expensive but very useful for universal quantum computing (see, e.g., M. A. Nielsen and I. L. Chuang, Quantum. Computation and Quantum information, 1st ed. (Cambridge University Press, 2004)). At physical error rates of $10^{-3}$, each T magic-state factory requires ~100 to ~1000 logical qubits to distill to machine-precision, and making a single T state costs a similar number of Clifford gates. See M. B. Hastings and J. Haah, Phys. Rev. Lett. 120, 050504 (2018). Though early approaches focused on minimizing the two-qubit $C_{NOT}$ cost g V. V. Shende, S. S. Bullock, and I. L. Markov, IEEE Transactions on Computer-Aided Design of integrated Circuits and Systems 25, 1000 (2006), quantph/11406176 (hereinafter "Shende")), it is largely unknown in state-of-art synthesis whether the T cost, which scales similarly to the Clifford cost, could be improved.

In this disclosure, an approach is disclosed that focuses on minimizing the T count. Notably, it was found that exploiting a variable number $\mathcal{O}(\lambda)$ of ancilla qubits enables a $\mathcal{O}(\lambda)$ improvement in the T count for $\lambda \in [1, \sqrt{N}]$ seen in Table 1, while keeping the Clifford count roughly unchanged. This leads to a T count of $\tilde{\mathcal{O}}(\sqrt{N})$, representing a quadratic speedup, for the case of preparing arbitrary pure states $$|\psi\rangle = \sum_{x=0}^{N-1} \frac{a_x}{\|\vec{a}\|_2} |x\rangle, \quad \|\vec{a}\|_q = \left(\sum_{j=0}^{N-1} |a_x|^q\right)^{1/q}, \quad (1)$$

or density matrices $$\rho = \sum_{x=0}^{N-1} \frac{|a_x|}{\|\vec{a}\|_1} |x\rangle\langle x| = Tr_{garbage}[|\psi\rangle\langle\psi|]$$

through their purification $$|\psi\rangle = \sum_{x=0}^{N-1} \sqrt{\frac{a_x}{\|\vec{a}\|_1}} |x\rangle |\text{garbage}_x\rangle. \quad (2)$$

Of some practical interest is circuit depth, Which also decreases by a factor $\mathcal{O}(\lambda)$ for any $\lambda \in [1, N]$. Moreover, all unconditional gate complexity lower bound is proven, independent of any complexity-theoretic assumptions, that demonstrates that an embodiment of the disclosed approach realizes an optimal ancilla-qubit and T count trade-off, up to logarithmic factors. A similar statement for synthesizing arbitrary unitaries is also proven.

Of course, the full quadratic speedup may not always be achievable, or practical. Space constraints of the physical machine limit ancilla usage, and T gates are only finitely expensive. Nevertheless, the ability to trade-off space for a T gate advantage will be very useful to optimizing physical qubit resources in quantum computers.

It is also useful to relate the disclosed approach to those that decompose additionally into black box data-lookup oracles O that allow coherent access to arbitrary classical data $\vec{a}$ like $$O|x\rangle|0\rangle|0\rangle = |x\rangle|a_x\rangle|\text{garbage}_x\rangle. \quad (3)$$

For instance, Grover search allows for arbitrary state preparation using $\mathcal{O}(\sqrt{NN})$ queries. See L. K. Grover, Proceedings of the Twenty-eight Annual ACM Symposium on Theory of Computing, STOC '96, 212 (1996). In fact, there exists classical data such that preparing any $|\psi\rangle$ requires only $\mathcal{O}(\text{polylog}(N))$ queries and additional primitive quantum gates. This, of course, hides the fact that implementing these oracles cost at least $\Omega(N)$ primitive gates in the worst cases.

The improved T gate scaling disclosed herein stems from an improved implementation of the data-lockup oracle of Equation 3. This improvement is referred to herein as a 'SELECTSWAP' network, which is decomposed fully into primitive gates. In other words, the results are expressed herein in terms of primitives gates only, which is much stronger than traditional query complexity analyses.

TABLE I

| State | Method | Qubits | Depth | T count |
|---|---|---|---|---|
| $\|\psi\rangle$ Eq. (1) | Shende | $\log N$ | $N \log \frac{N}{\epsilon}$ | $N \log \frac{N}{\epsilon}$ |
| | | $\lambda \log \frac{N}{\epsilon}$ | $\frac{N}{\lambda} + \log^2 \frac{N}{\epsilon}$ | $\frac{N}{\lambda} + \lambda \log^2 \frac{N}{\epsilon}$ |
| $\rho$ Eq. (2) | Babbush | $\log \frac{N}{\epsilon}$ | $N + \log \frac{1}{\epsilon}$ | $N + \log \frac{N}{\epsilon}$ |
| | | $\lambda \log \frac{N}{\epsilon}$ | $\frac{N}{\lambda} \log \lambda + \log \frac{1}{\epsilon}$ | $\frac{N}{\lambda} + \lambda \log \frac{N}{\epsilon}$ |

| Operation | Qubits | Depth | T count |
|---|---|---|---|
| SELECT | $b + \log N$ | $N$ | $N$ |
| SWAP | $bN$ | $\log N$ | $bN$ |
| SELECTSWAP | $b\lambda + \log N$ | $\frac{N}{\lambda} \log \lambda$ | $\frac{N}{\lambda} + b\lambda$ |

(Top) Big-$\mathcal{O}(\cdot)$ cost of preparing an arbitrary quantum state of dimension N with error $\epsilon$. The Clifford gate complexity for all approaches is $\mathcal{O}\left(N \, polylog\left(\frac{N}{\epsilon}\right)\right)$.

(Bottom) Big-$\mathcal{O}(\cdot)$ cost of implementing the data lookup oracle O of Eq. (3). Constant-depth quantum fanouts using stabilizer measurements are applied where applicable to reduce circuit depth. Our results allow for a space-depth trade-off determined by a choice of $\lambda \in [1, N]$, with a minimized T gate complexity of $\mathcal{O}(\sqrt{N})$ by choosing $\lambda \sim \sqrt{N}$.

The description begins by describing this network. Subsequently, the 'SELECTSWAP' network is applied to the state preparation problem. Using Householder reflections, unitary synthesis is then reduced to state preparation in the appendix. The optimality of this approach is then discussed through matching lower bounds.

III. Example Embodiments

III.A. Data-Lookup Oracle by a SelectSwap Network

The unitary data-lookup oracle of Equation 3 accepts an input number state $|x\rangle \in \mathbb{C}^N$ where $x \in [N]$, and returns a b-bit number $a_x \in \{0, 1\}^b$, where the N values of $a_x$ are unstructured but known. The attached garbage state may always be uncomputed by applying O in reverse. An embodiment of the disclosed approach interpolates between standard implementations of O. These are SELECT and SWAP with cost stated in Table 1, which is outlined below.

The SELECT operator applies some arbitrary unitary $V_x$ controlled by the state $|x\rangle$, that is SELECT=$\Sigma_{x=0}^{N-1} |x\rangle \langle x| \otimes V_x$. See A. M. Childs, D. Maslov, Y. Nam, N. J. Ross, and Y. Su, arXiv preprint arXiv:1711.10980 (2017). 1711.10980v1.

Thus O is realized by choosing $$V_x = X^{a_x} \equiv \bigotimes_{j=0}^{b-1} X^{a_{x,j}}$$

to either be identity or the Pauli-X gate depending on the bit string $a_x$. As illustrated in block diagram 100 of FIG. 1, the binary control logic costs $\mathcal{O}(N)$ Clifford+T gates. As controlled-X too is Clifford, $\mathcal{O}(bN)$ Clifford gates are applied in total, and the total T gate complexity remains $\mathcal{O}(N)$. These CNOTs may be applied in parallel with constant depth using a quantum fanout, and is applied wherever applicable.

Figure 1:
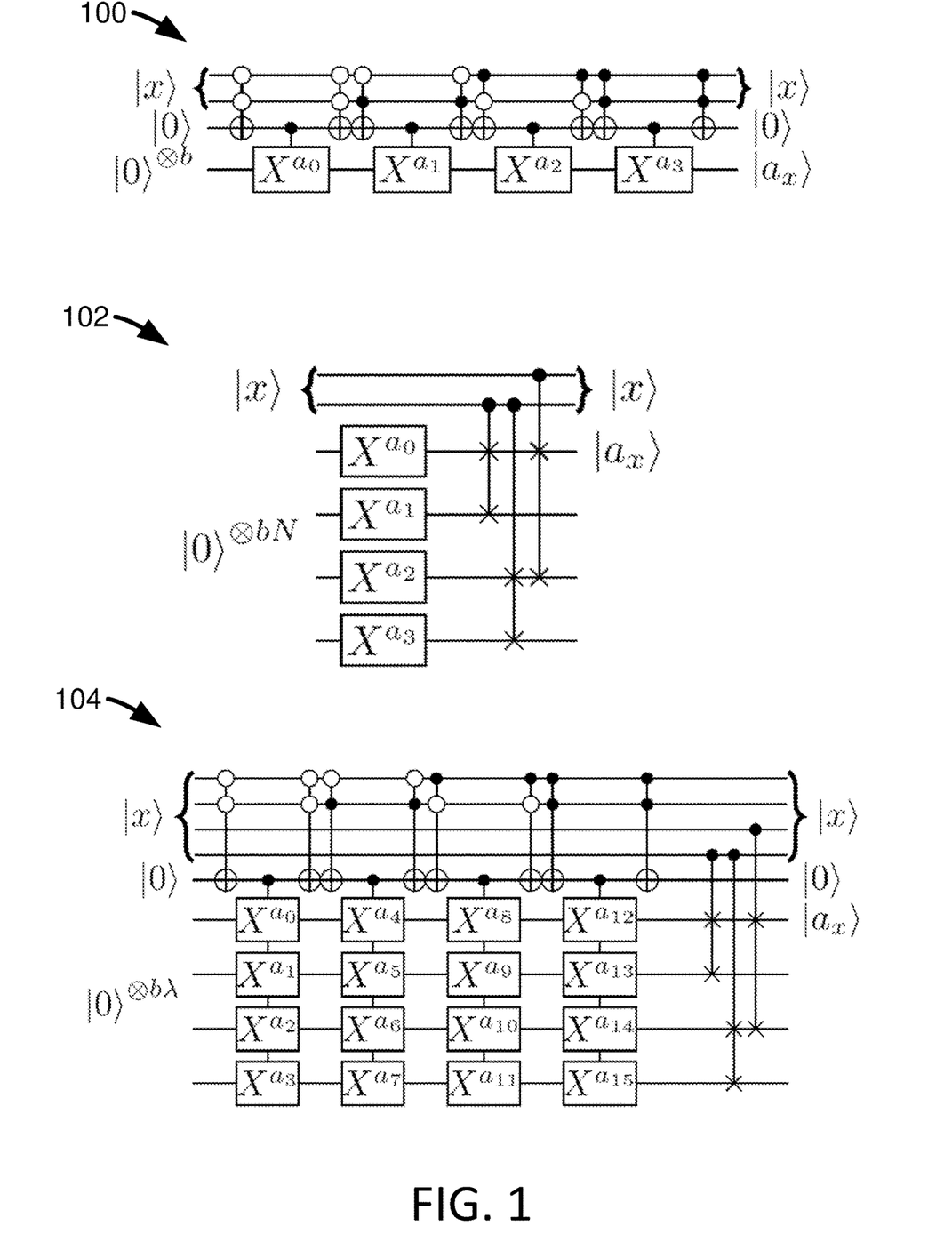
FIG. 1 is a series of schematic block diagram illustrating aspects of the disclosed technology.

FIG. 1 is a series of schematic block diagrams 100, 102, 104 illustrating aspects of the disclosed technology. In particular, block diagram 100 illustrates the SELECT operator $\Sigma_{x=0}^{N-1} |x\rangle \langle x| \otimes X^{a_x}$ X with N=4. A naive decomposition of all multiply-controlled-NOTs requires $\mathcal{O}$ (N log N) Clifford+T gates. However, cancellation of adjacent gates reduces this to only $\mathcal{O}$ (N). Block diagram 102 illustrates the SWAP network with N=4. Binary values $a_x$ are encoded $X^{a_x}$, and are then swapped to the position of the top register using, a swap network constructed from $\mathcal{O}$ (bN) Clifford–T gates. Block diagram 104 illustrates an embodiment of the disclosed SELECTSWAP network with N=16, $\lambda$=4 that combines the above two approaches.

The SWAP operator records all values $a_x$ in the states $|a_x\rangle$ initialized using $X^{a_x}$ applied to N copies of a b-bit register. As illustrated 1n FIG. 1, a network of controlled-swap operators then permutes the desired state $|a_x\rangle$ to fixed location. As each controlled-swap operator decomposes into two CNOTs and one TOFFOLI, this network uses $\mathcal{O}$ (bN) Clifford+T gates.

The disclosed SELECTSWAP network illustrated by schematic block diagram 104 is a hybrid of the above two schemes. Similar to the SWAP approach, the disclosed network duplicates the b-bit register $\lambda$ times, where $\lambda \in [1, N]$ is an integer. Without loss of generality to the scaling, one can assume for simplicity that $\lambda = 2^m$ and $N = 2^n$ are powers of two. One can then use the SELECT operator, controlled by the first n–m qubits of $|x\rangle$, to write multiple values of $a_x$ at a time into these duplicated registers. As there are $\lambda$ b-bit registers, one can choose $V_x = \bigotimes_{j=0}^{\lambda-1} X^{a_{xN/\lambda+j}}$, where $x \in [0, N/\lambda-1]$. The SWAP network controlled by the remaining qubits of $|x\rangle$ then moves the desired data entry $|a_x\rangle$ to a fixed location. As the T gate complexity of $$\mathcal{O}\left(\lambda b + \frac{N}{\lambda}\right)$$

is determined only by the dimension of the SELECT and SWAP control registers, this is minimized with value $\mathcal{O}$ ($\sqrt{Nb}$) at $\lambda = \mathcal{O}$ ($\sqrt{N/b}$).

III.B. Arbitrary Quantum State Preparation

Preparation of an arbitrary dimension $N=2^n$ quantum state $$|\psi\rangle = \frac{1}{\|\vec{a}\|_2} \sum_{x \in \{0,1\}^n} a_x |x\rangle$$

using the SELECTSWAP network is now straightforward. One can invoke results in prior art that rely on the data-lookup oracle of Equation 3.

For any bit-string $y \in \{0, 1\}^w$ of length $w \leq n$, let the probability that the first w qubits of $|\psi\rangle$ are in state $$|y\rangle \text{ be } p_y = \frac{1}{\|\vec{a}\|_2^2} \sum_{\text{prefix}_w(x)=y} |a_x|^2.$$

Thus a single-qubit rotation $e^{-iY\theta}|0\rangle$ by angle $\theta = \cos^{-1} \sqrt{p_0}$ prepares the state $|\psi_1\rangle = \sqrt{p_0}|0\rangle + \sqrt{p_1}|1\rangle$, where $p_0$ is the probability that the first qubit of $|\psi\rangle$ is in state $|0\rangle$. One can recursively apply single-qubit rotations on the $w+1^{th}$ qubit conditioned on the first w qubits being in state $|y\rangle$. The rotation angles $\theta_y = \cos^{-1} \sqrt{p_{y0}/p_y}$ are chosen so that the state produced $|\psi_{w+1}\rangle$ reproduces the correct probabilities on the first w+1 qubits. For instance when w=1, one can map $$|\psi_1\rangle \mapsto |\psi_2\rangle = \sqrt{p_0} |0\rangle \left( \sqrt{\frac{p_{00}}{p_0}} |0\rangle + \sqrt{\frac{p_{01}}{p_0}} |1\rangle \right) + \sqrt{p_1} |1\rangle$$

$$\left( \sqrt{\frac{p_{10}}{p_1}} |0\rangle + \sqrt{\frac{p_{11}}{p_1}} |1\rangle \right).$$

These conditional rotations are implemented using a sequence of data-lookup oracles $O_1, \ldots, O_{n-1}$, where $O_w$ stores a b-bit approximation of all $\theta_y$ where $y \in \{0, 1\}^w$. At the $w^{th}$ iteration, $$|\psi_w\rangle = \sum_{y \in \{0,1\}^w} \sqrt{p_y} |y\rangle \underset{O_w}{\mapsto} \sum_{y \in \{0,1\}^w} \sqrt{p_y} |y\rangle |\theta_y\rangle \mapsto \sum_{y \in \{0,1\}^w} \sqrt{p_y} | \quad (4)$$

$$y\rangle \left( \sqrt{\frac{p_{y0}}{p_y}} |0\rangle + \sqrt{\frac{p_{y1}}{p_y}} |1\rangle \right) |$$

$$\theta_y\rangle \underset{O_w^\dagger}{\mapsto} \sum_{y \in \{0,1\}^{w+1}} \sqrt{p_y} |y\rangle = |\psi_{w+1}\rangle.$$

Note that any garbage registers are omitted as they are always uncomputed. Also, the second line is implemented using b single-qubit rotations each controlled by a bit of $\theta_y$. The complex phases of the target state $|\psi\rangle$ are applied to $|\psi_n\rangle$ by a final step with a data-lookup oracle storing $\phi_x = \arg[a_x/\sqrt{p_x}]$. Thus $\mathcal{O}$ (b log N) single-qubit rotations are applied in total.

These oracles are implemented with the SELECTSWAP network of schematic block diagram 104 of FIG. 1, using a fixed value of $\lambda$ for all $O_k$. A straightforward sum over the T count of FIG. 1 is $$O\left(b\lambda\log(N) + \frac{N}{\lambda}\right),$$

which is then added to the total T count of $$O\left(b\log\left(\frac{N}{\delta}\right)\right)$$

for synthesizing all single-qubit rotations each to error $\delta$ using the phase gradient technique (see, e.g., C. Gidney, Quantum 2, 74 (2018)). The error of the resulting state $|\psi'\rangle$ produced is determined by the number of bits b used to represent the rotation angles, in addition to rotation synthesis error $\delta$s. Adding these errors leads to $$\||\psi'\rangle - |\psi\rangle\| = \underbrace{O(\delta)}_{\text{rotation synthesis}} + \underbrace{O(2^{-b}\log N)}_{\text{bits of precision}} \leq \epsilon,$$

which is bounded by $\epsilon$ with the choice $$b = \Theta\left(\log\left(\frac{\log N}{\epsilon}\right)\right)$$

and $\delta = \Theta(\epsilon)$. As a function of $\epsilon$, the total T gate complexity is then $$O\left(\frac{N}{\lambda} + \lambda\log^2\left(\frac{N}{\epsilon}\right)\right).$$

A similar calculation for the total depth leads to the complexity in Table 1.

III.C. Purified Density Matrix Preparation

In some applications, it suffices to prepare the density matrix $$\rho = \sum_{x=0}^{N-1} \frac{|a_x|}{\|\vec{a}\|_1} |x\rangle\langle x|$$

through a quantum state $$|\psi\rangle = \sum_{x=0}^{N-1} \sqrt{\frac{a_x}{\|\vec{a}\|_1}} |x\rangle | \text{garbage}_x\rangle$$

of Eq. (2) where the number state $|x\rangle$ is entangled with some garbage that depends only on x. By allowing garbage, it was shown by R. Babbush, C. Gidney, D. W. Berry, N. Wiebe, J. Mc-Clean, A. Paler, A. Fowler, and H. Neven, arXiv preprint arXiv:1805.03662 (2018) that strictly linear T gate complexity in N is achievable, using a SELECT data-lookup oracle corresponding to the λ=1 case of Table 1. We outline the original idea, then generalize the procedure using the SELECTSWAP network, which enables sublinear T gate complexity and better error scaling than the garbage-free approach. As density matrices have positive diagonals, only consider the case of positive $a_x \geq 0$.

The original approach is based on an observation, By comparing a b-bit number state $|a\rangle$ together with a uniform superposition state $$|u_{2^b}\rangle = \frac{1}{\sqrt{2^b}} \sum_{j=0}^{2^b-1} |j\rangle$$

over $2^b$ elements, $|a\rangle$ may be mapped to $$|a\rangle \rightarrow |a\rangle \left( \sqrt{\frac{a}{2^b}} |0\rangle |u_a\rangle + \sqrt{\frac{2^b-a}{2^b}} |1\rangle |u_{\geq a}\rangle \right), \quad (5)$$

where we denote a uniform superposition after the first a elements by $$|u \geq a\rangle = \sum_{j=a}^{2^b-1} \frac{|j\rangle}{\sqrt{2^b-a}}.$$

This may be implemented using quantum addition (see S. A. Cuccaro, T. C. Draper, S. A. Kutin, and D. P. Moulton, arXiv preprint quant-ph/0410184 (2004)), which costs $\mathcal{O}$ (b) Clifford+T gates with depth $\mathcal{O}$ (b).

This observation is converted to state-preparation in four steps. First, the normalized coefficients $$a_x \frac{N2^b}{\|a\|_1} \approx a'_x$$

are rounded to nearest integer values such that $\|\vec{a}'\|_1 = N2^b$. Second, the data-lookup oracle that writes two numbers $a''_x \in [2^b]$ and $f(x) \in [N]$ such that $a'_x = a''_x + \sum_{y \in \{f^{-1}(x)\}} (2^b - a''_y)$. Thus $$O|x\rangle |0\rangle |0\rangle = |x\rangle |a''_x\rangle |f(x)\rangle, \quad (6)$$

where the irrelevant garbage state has been omitted. Third, the oracle O is applied to a uniform superposition over $|x\rangle$, and the comparator trick of Eq. (5) is applied. This produces the state $$\sum_{x=0}^{N-1} \frac{|x\rangle}{\sqrt{N}} |a''_x\rangle |f(x)\rangle \left( \sqrt{\frac{a''_x}{2^b}} |0\rangle |u_{a''_x}\rangle + \ldots |1\rangle |u \geq a''_x\rangle \right).$$

Finally, $|f(x)\rangle$ is swapped with $|x\rangle$, controlled on the $|1\rangle$ state. This leads to a state $$|\psi\rangle = \sum_{x=0}^{N-1} \sqrt{\frac{a'_x}{\|\vec{a}'\|_1}} |x\rangle |\text{garbage}_x\rangle.$$

After tracing out the garbage register, the resulting density matrix $\rho'$ approximates the desired state $\rho$ with trace distance $$\|\rho' - \rho\|_1 = \mathcal{O} (2^{-b}) \leq \epsilon. \quad (7)$$

The T gate complexity is then the cost of the data-lookup oracle of Eq. (6) plus $\mathcal{O}$ (b) for the comparator of Eq. (5), plus $\mathcal{O}$ (log N) for the controlled swap with $|f(x)\rangle$. By implementing this data-lookup oracle with the SELECTSWAP network, one immediately obtains the stated T gate complexity of $$O\left(\lambda(b + \log N) + \frac{N}{\lambda}\right) = O\left(\lambda \log(N/\epsilon) + \frac{N}{\lambda}\right),$$

where $b = \mathcal{O}$ (log (1/$\epsilon$)) is chosen.

III.D. Lower Bound

In this section, the optimality of the above-described construction is proven through a circuit counting argument. The most general circuit on q qubits that uses Γ T-gates has the canonical form $C \cdot \Pi_{j=1}^{\Gamma} e^{-i\pi P_j/8}$, where each $P_j$ is one of $4^q$ possible Pauli operators, and C is one of $2^{\mathcal{O}(q^2)}$ possible Clifford operators. Thus the number of unique quantum circuits is at most Unique quantum circuits = $\mathcal{O} (4^{q\Gamma + \mathcal{O}(q^2)})$ (8)

A lower bound on the cubit and T-gate complexity of the data-lookup oracle of Equation 3 is obtained by counting the number of unique Boolean functions $f:[N] \rightarrow \{0, 1\}^b$. As there are $2^{bN}$ such functions, one can compare with Eq. (8). This leads to a lower bound on the space-T-gate product $$q\Gamma = \Omega(bN - q^2). \quad (9)$$

As the SELECTSWAP complexity in block diagram 104 of FIG. 1 is $q\Gamma = \mathcal{O}(\lambda^2 b^2 + bN + \log(N)(1/\lambda + \lambda b))$, this is optimal up to logarithmic factors so long as the number of T-gates dominates the qubit count like $\lambda = o(\sqrt{N/b})$, which is the case in most quantum circuits of interest.

A similar lower bound on state preparation is obtained by counting the number of dimension-N quantum states that a distinguishable with error $\epsilon$. Without loss of generality, one can only count quantum states $|\psi\rangle \in \mathbb{R}^N$ with real coefficients. These states live on the surface a unit-ball $\mathbb{B}_N$ of dimension N, with area $$\text{Area}[\mathbb{B}_N] = \frac{2\pi^{N/2}}{(N/2-1)!}.$$

Let one now fix a state $|\psi\rangle$. Then the states $|\chi\rangle$ that satisfy $\||\psi\rangle - |\chi\rangle\| \leq \epsilon$ live inside a $\epsilon$-ball $\mathbb{B}_{N-1}$ with volume $$O(Vol[\mathbb{B}_{N-1}] \epsilon^{N-1}) = O\left(\frac{\pi^{N/2}}{(N/2)!} \epsilon^{N-1}\right).$$

Thus there are at least $$\Omega\left(\frac{\text{Area}[B_N]}{\text{Vol}[B_{N-1}]\epsilon^{N-1}}\right) = \Omega(\sqrt{N}\,\epsilon^{-N+1})$$

quantum states. Once again by comparing with Eq. (8), one can obtain a T-gate lower bound of $$q\Gamma = \Omega(N \log(1/\epsilon) - q^2). \qquad (10)$$

This also matches the cost of the disclosed approach in Eq. (8) up to logarithmic factors, so long as $\lambda = o(\sqrt{N/\log(1/\epsilon)})$. An analogous argument can be made for density matrix preparation by considering the unit simplex instead of the unit ball.

III.E. Error Analysis of Arbitrary Quantum State Preparation

The approach by Shende, Bullock, and Markov synthesizes a unitary A that prepares a pure state $$A|0\rangle = \sum_{x=0}^{N} \frac{a_x}{\|\vec{a}\|_2} |x\rangle = |\psi\rangle$$

with arbitrary coefficients in $N = 2^n$ dimensions. A key element of the circuit are $j \in \{0, 1, \ldots n-1\}$ multiplexors $U_j$ where $$U_j = \sum_{x=0}^{2^j-1} |x\rangle\langle x| \otimes e^{-i\pi\theta_{j,x}Z}, \qquad (11)$$

for some set of rotation angles $\theta_{j,x}$. Each multiplexor is applied twice—once to create a pure state with the right probabilities $|a_x|^2$, and once to apply the correct phase $e^{i\,\arg[a_x]}$. In the following, these multiplexors $U_j$ are approximated by a unitary $U'_j$ to error $\delta$ like $\|U'_j - U_j\| \le \delta$. Using a triangle inequality, this leads to an approximate A' such that $$\|A' - A\| \le 2n\delta. \qquad (12)$$

Hence the state $|\psi'\rangle = A'|0\rangle$ approximates $|\psi\rangle$ with error $$\||\psi'\rangle - |\psi\rangle\| \le \|A' - A\| \le 2n\delta. \qquad (13)$$

In embodiments of the disclosed approach, these multiplexors are implemented using the data-lookup oracles $O_j$ that encode a b-bit approximation $\theta'_{j,x}$ of these angles, that is $|\theta'_{j,x} - \theta_{j,x}| \le 2^{-b}$. In other words, $$O_j|x\rangle|0\rangle = |x\rangle|\theta'_{x,k}\rangle. \qquad (14)$$

Using the controlled phase gradient operation $$\text{GRAD} = |0\rangle\langle 0| \otimes G^\dagger + |0\rangle\langle 0| \otimes G, \qquad (15)$$

$$G = \sum_{\theta=0}^{2^b-1} e^{-\pi\theta 2^{-b}} |\theta\rangle\langle\theta|,$$

this implements the multiplexor $U_j^{(1)}$ where $$U'_j = \sum_{x=0}^{2^j-1} |x\rangle\langle x| \otimes e^{-i\pi\theta'_{j,x}Z}. \qquad (16)$$

This approximates $U_j$ with error $$\|U'_j - U_j\| \le \|I - e^{i\pi 2^{-b}}\| \le \pi 2^{-b}. \qquad (17)$$

One also needs to account for he cost of approximating the phase gradient operation. A naive approach implements GRAD using b single-quit rotations $e^{-i\pi 2^{-k}Z}$, each controlled by the $k^{th}$ output bit of $O_j$. Using standard single-qubit unitary synthesis techniques (see V. Kliuchnikov, D. Maslov, and M. Mosca, Phys. Rev. Lett. 110, 190302 (2013)), approximating GRAD to error γ requires $$O\left(b\log\frac{b}{\gamma}\right) \text{Clifford} + T \text{ gates.}$$

The resulting unitary A'' prepares the state $|\psi''\rangle = A''|0\rangle$ that approximates $|\psi\rangle$ with error $$\||\psi''\rangle - |\psi\rangle\| \le \|A'' - A\| \le \pi n 2^{-b+1} + n\gamma \le \epsilon,$$

which is controlled by choosing $$b = \Theta\left(\log\left(\frac{n}{\epsilon}\right)\right) \text{ and } \gamma = \Theta\left(\frac{\epsilon}{n}\right).$$

A better approach (see C. Gidney, Quantum 2, 14 (2018)) implements the phase gradient GRAD with a reversible adder ADD applied to the Fourier state $\mathcal{F}$ where $$\text{ADD}|x\rangle|y\rangle = |x\rangle|y + x \bmod 2^b\rangle, \qquad (18)$$

$$|\mathcal{F}\rangle = \frac{1}{\sqrt{2^b}} \sum_{x=0}^{2^b-1} e^{i\pi x/2^b} |x\rangle.$$

Thus $$\text{ADD}|x\rangle|\mathcal{F}\rangle = e^{-i\pi x 2^{-b}}|x\rangle|\mathcal{F}\rangle. \qquad (19)$$

The T cost: of each adder is $\mathcal{O}(b)$. As the Fourier state is not consumed, an approximation $|\mathcal{F}'\rangle$ of it to error γ has a one-time T cost of $\mathcal{O}(b \log(1/\gamma))$. The resulting unitary A''' prepares the state $|\psi'''\rangle = A'''|0\rangle|\mathcal{F}'\rangle$. This approximates $|\psi\rangle$ with error $$\||\psi'''\rangle - |\psi\rangle|\mathcal{F}'\rangle\| \le \pi n 2^{-b+1} + \gamma \le \epsilon,$$

which is controlled by choosing $$b = \Theta\left(\log\left(\frac{n}{\epsilon}\right)\right) \text{ and } \gamma = \Theta(\epsilon).$$

III.F. Reducing Unitary Synthesis to State Preparation

Consider N×N unitary matrix U and let integer K be between 1 and N. Isometry synthesis problem for U is to find a quantum circuit that implements unitary V, such that its first K columns equal to first K columns of V. To define approximate unitary isometry problem, one can use the notion of weak semi-two norm $\|A\|_{2,K} = \max_{b<K} \|A|b\rangle\|$. Weak semi-two-norm with parameter K of matrix A is the biggest norm of vectors ∥Ax∥ where x goes over the first K standard basis vectors. Note that $\|V-U\|_{2,K}=0$ if and only if first K columns of V and U coincide. This is why map $A \mapsto \|A\|_{2,K}$ is called semi-norm: $\|A\|_{2,K}=0$ does not imply that A=0. The approximate isometry synthesis problem for target unitary U and precision ε is to find a circuit that implements unitary V such that $\|V-U\|_{2,K} \leq \varepsilon$.

It has been shown in E. Knill, "Approximation by Quantum Circuits," arXiv:quant-ph/9508006 (1995) [quant-ph] that isometry synthesis problem can be reduced to K state synthesis problems and synthesis of K operators $\exp(e^{i\phi}|e_1\rangle\langle e_1|)$ where $|e_1\rangle$ is the first standard basis vector. The idea, is illustrated here for K=N. Using eigen-basis $|u_k\rangle$ unitary matrix U can be written as $\exp(\Sigma_{k=1}^{N} i\phi_k |u_k\rangle\langle u_k|)$. Introducing operations $R_k = \exp(e^{i\phi_k}|u_k\rangle\langle u_k|)$ one can express U as product $\Pi_{k=1}^{N} R_k$. Let $V_k$ be a unitary operator that prepares state $u_k$ starting from $|e_1\rangle$ then $R_k = V_k \exp(e^{i\phi_k}|e_1\rangle\langle e_1|)V_k^\dagger$. The case K<N follows from the Lemma 3.10 on Page 10. The lemma shows that any unitary matrix U can be replaced by a unitary matrix U' such that first K columns of U and U' coincide and U' has at least N−K eigenvalues equal to 1. This implies that at least N−K operators $R_k$ in the decomposition of U' are identity operators. Using outline scheme the cost of isometry synthesis is twice the cost of state synthesis of each eigen-vector $|u_k\rangle$ plus the cost of synthesis of each of $\exp(e^{i\phi_k}|e_1\rangle\langle e_1|)$.

Alternatively, one can use Householder reflections decomposition (see, e.g., A. S. Householder, Journal of the ACM 5, 339 (1958) to find another U" that is a product of K reflections $\exp(e^{i\pi}|v_j\rangle\langle v_j|) = \mathbb{1} - 2|v_j\rangle\langle v_j|$ and diagonal matrix $\mathrm{diag}(e^{i\phi'_1}, \ldots, e^{i\phi'_K}, 1, \ldots, 1)$ such that first K columns of U and U" coincide. Note that the representation of a unitary as a product of N operators $\exp(e^{i\phi}|v_j\rangle\langle v_j|)$ is not unique, another method for finding such decomposition closely related to A. S. Householder, Journal of the ACM 5, 339 (1958) can be found in P. A. Ivanov, E. S. Kyoseva, and N. V. Vitanov, (2007), 10.1103/PhysRevA.74.022323, arXiv:0708.2811. It has a slight advantage in that it does not require finding eigen-basis of U.

It is possible to get rid of the need for implementing $\mathrm{diag}(e^{i\phi'_1}, \ldots, e^{i\phi'_K}, 1, \ldots, 1)$ or $\exp(e^{i\phi}|e_1\rangle\langle e_1|)$ by using one ancillary qubit as discussed in V. Kliuchnikov, ArXiv e-prints, 1 (2013), arXiv:1306.3200 [quant-ph]. To implement unitary U it is sufficient to implement unitary $W=|0\rangle\langle 1| \otimes U + |1\rangle\langle 0| \otimes U^\dagger$ by using reflection decomposition. Let $u_1, \ldots, u_N$ be columns of U. According to Lemma 1 on Page 1, operator W is equal to the product of reflections $\mathbb{1} - 2|\psi\rangle\langle\psi|$ where $|\psi\rangle$ goes over vectors $|w_j\rangle = (|1\rangle \otimes |j\rangle - |0\rangle \otimes |u_j\rangle)/\sqrt{2}$ for j from 1 to N. It is sufficient to take product of reflections around $|w_j\rangle$ for j from 1 to K if one is interested in implementing first K columns of U. Finally, note that given unitary $V'_j$ that prepares $|u_j\rangle$ starting from $|e_1\rangle$, one can prepare state $|w_j\rangle$ starting from $|0\rangle \otimes |e_1\rangle$. First apply Hadamard gate to the first qubit, then the sequence of CNOT gates to prepare state $|1\rangle \otimes |j\rangle + |0\rangle \otimes |e_1\rangle$ and finally apply Controlled-$V'_j$ negatively controlled on the first qubit. When this method is applied to the synthesis of sparse isometries, the states being synthesized are again sparse. The number of non-clifford gates used to synthesize an isometry is twice the number of non-clifford gates needed to synthesize each of K columns controlled on a qubit.

Approximate isometry synthesis reduces to approximate state synthesis by using discussed decompositions and properties of semi-norms $\|A\|_{2,K}$ discussed in E. Knill, 1 (1995), arXiv:quant-ph/9508006 [quant-ph].

III.G. Lower Bounds

The total number of isometries within at least distance ε from each other can be estimated using Lemma 4.3 on Page 14. Roughly, the number isometries is $\Omega((1/\varepsilon)^{KN})$.

Figure 6:
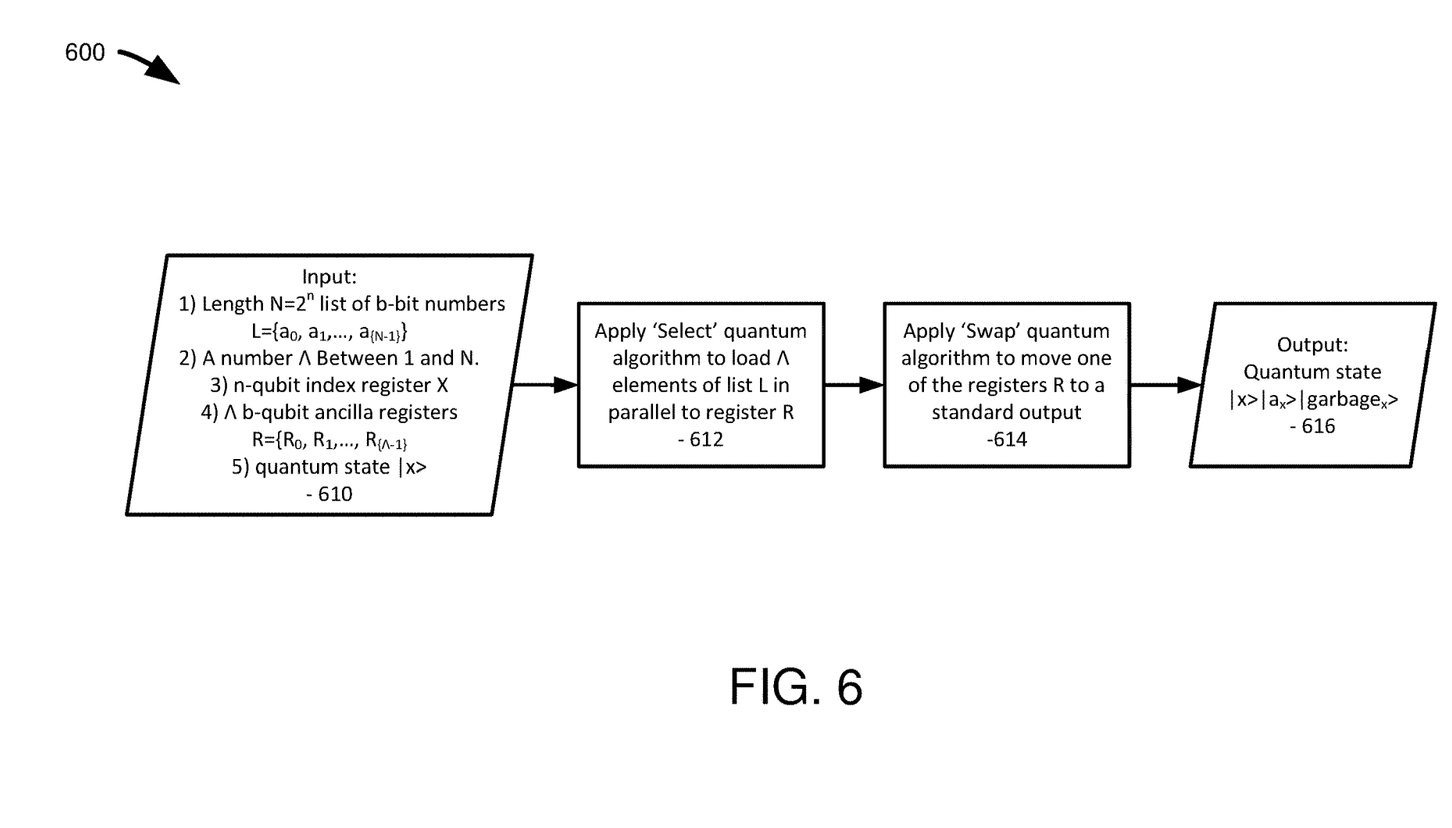
FIG. 6 is a flowchart showing an example embodiment for implementing an embodiment of the disclosed technology.

FIG. 6 is a flowchart 600 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 600 illustrates a method for synthesizing a data-lookup oracle in accordance with the disclosed technology.

At 610, various input parameters are input. In the illustrated embodiment, the input parameters are: (1) Length N=$2^n$ list of b-bit numbers $L = a_0 a_1, a_{N-1}$; (2) A number Between 1 and N; (3) n-qubit index register X; (4) b-qubit ancilla registers $R = R_0, R_1, R_{-1}$; and (5) quantum state $|x\rangle$.

At 612, the Select quantum algorithm is applied to load elements of list L in parallel to register R.

At 614, the Swap quantum algorithm is applied to move one of the registers R to a standard output.

At 616, a quantum state quantum state $|x\rangle|a_x\rangle|\mathrm{garbage}_x\rangle$ is output.

Figure 7:
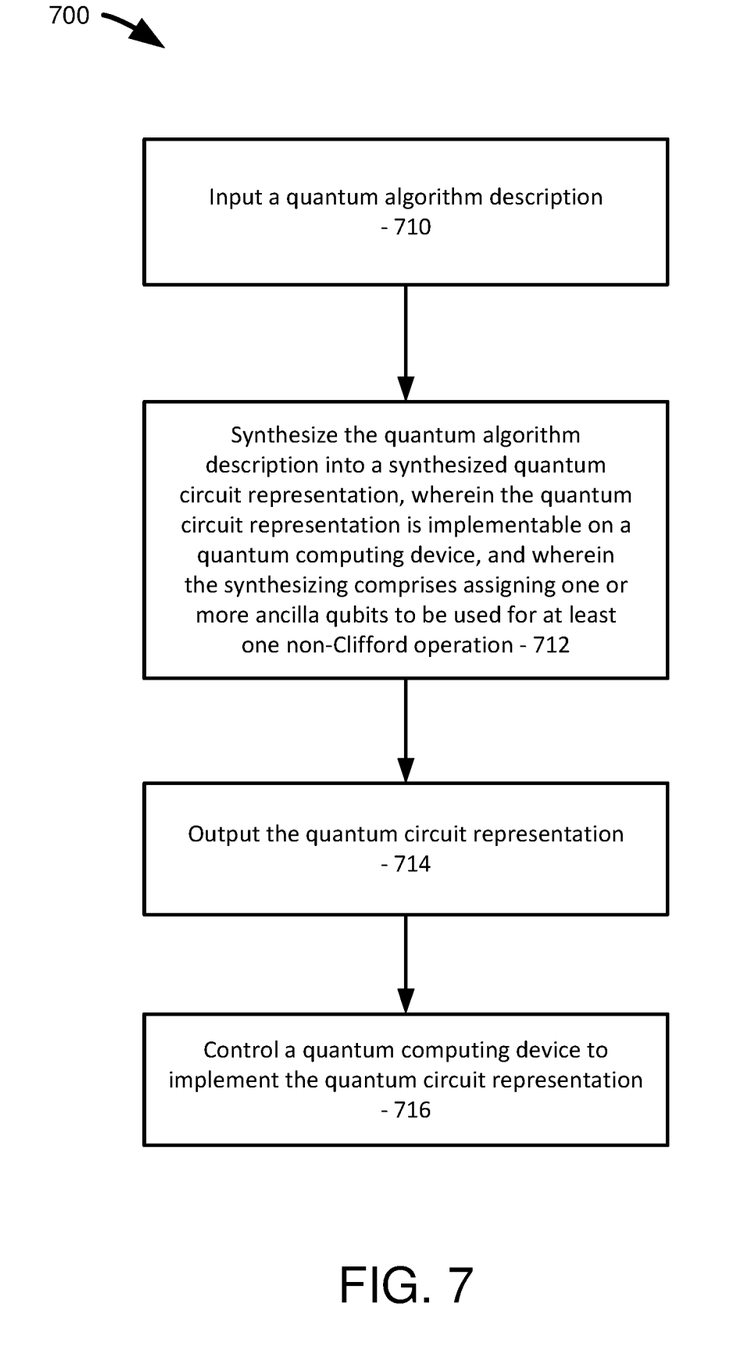
FIG. 7 is a flowchart showing another example embodiment for implementing an embodiment of the disclosed technology.

FIG. 7 is a flowchart 700 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 700 illustrates a method for synthesizing a quantum circuit description in accordance with the disclosed technology.

At 710, a quantum algorithm description is input (e.g. into a classical computer). The quantum algorithm description can be, for example, a description in a high-level functional language (e.g., F #).

At 712, the quantum algorithm description is synthesized into a synthesized quantum circuit representation (e.g., using the classical computer and using an appropriate compilation/synthesis tool for quantum computing, such as LIQUi|>). In the illustrated embodiment, the quantum circuit representation is implementable on a quantum computing device, and the synthesizing comprises assigning one or more ancilla qubits to be used for at least one non-Clifford operation.

At 714, the synthesized quantum circuit representation is output. The synthesized quantum circuit representation is a set of low-level machine instructions for implementation on a quantum device.

Figure 5:
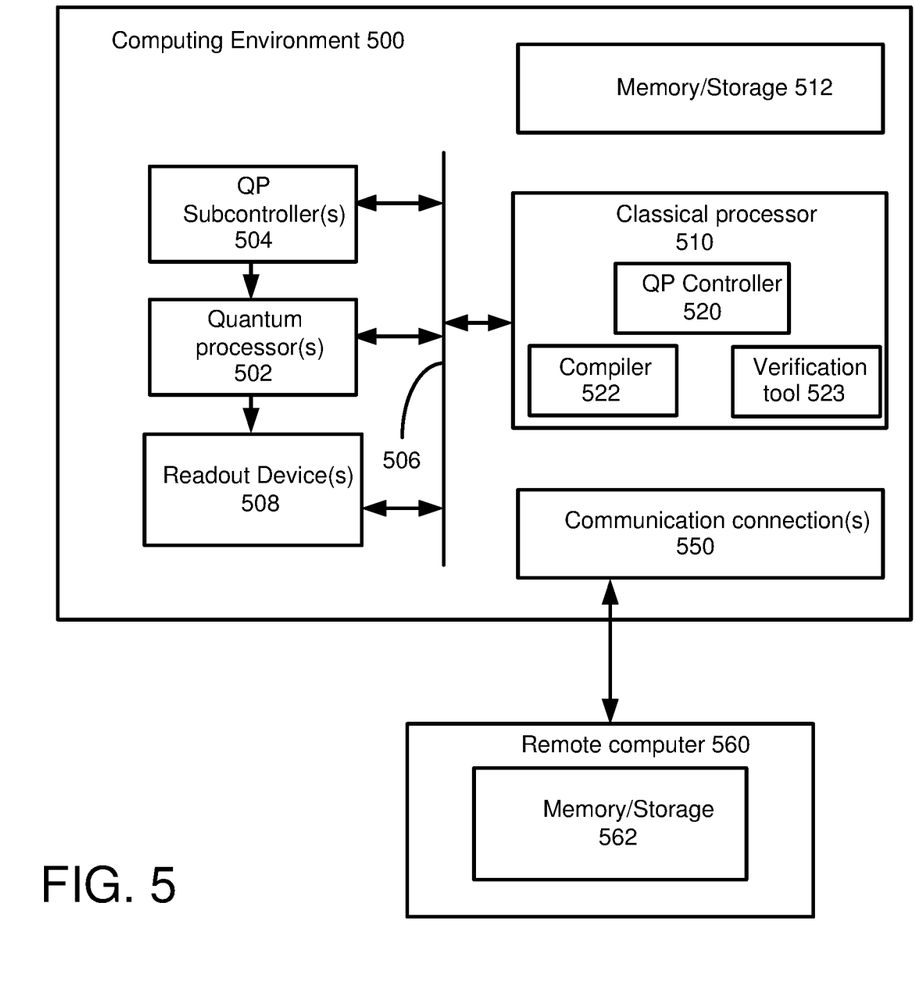
FIG. 5 is an exemplary system for implementing embodiments of the disclosed technology.

At 716, a quantum computing device is controlled to implement the quantum circuit representations (e.g., by a classical computer in communication with a quantum computing device, such as in a configuration as shown in FIG. 5).

In some embodiments, the ancilla qubits to be used for at least one non-Clifford operation replace at least one Toffoli-gate. In further embodiments, the synthesized quantum circuit representation includes a combination of both Toffili gates and ancilla qubits to perform non-Clifford operations, the combination being determined at least in part by a user-selectable variable. In certain embodiments, the synthesizing comprises using a select-swap operation. In particular implementations, the select-swap operation enables sublinear T-gate complexity. In further implementations, the select-swap operation results from a combination of a select operation and a swap network. In some embodiments, the method reduces non-Clifford gates at a cost of greater overall ancilla qubits. In further embodiments, the synthesizing implements a data-lookup oracle using a select-swap operation. In certain embodiments, the method is performed to synthesize arbitrary unitaries.

Any of the disclosed embodiments can be implemented by one or more computer-readable media storing computer-executable instructions, which when executed by a computer cause the computer to perform any of the disclosed methods. Also disclosed herein are systems for performing embodiments of the disclosed embodiments comprising a classical computer configured to program, control, and/or measure a quantum computing device.

Further embodiments include a quantum circuit comprising a combination of Clifford and non-Clifford gates, wherein the number of non-Clifford gates is controlled by a tunable factor, wherein the tunable factor achieves a desired space-depth tradeoff for the quantum circuit.

IV. Example Computing Environments

Figure 2:
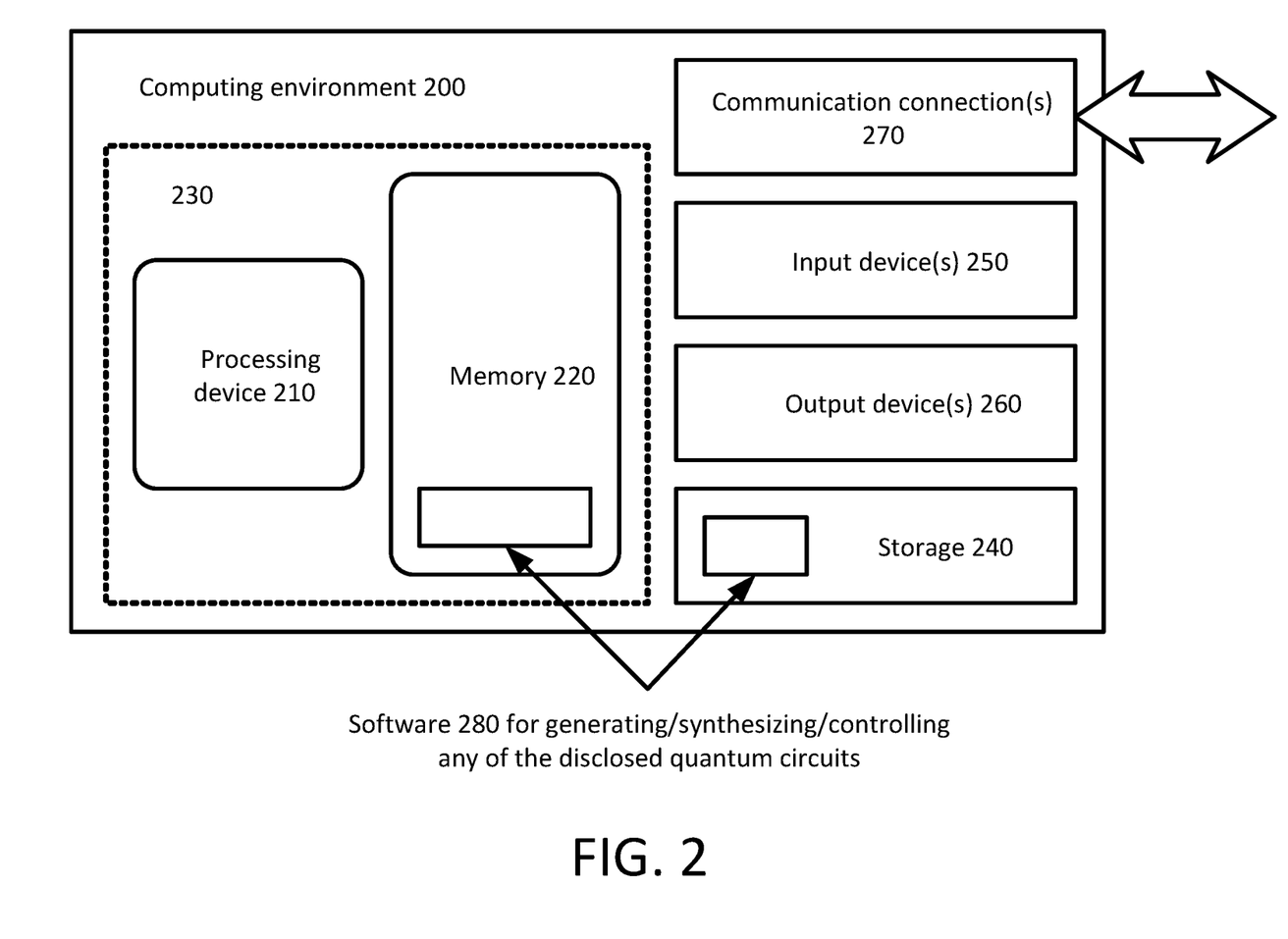
FIG. 2 illustrates a generalized example of a suitable classical computing environment in which several of the described embodiments can be implemented.

FIG. 2 illustrates a generalized example of a suitable classical computing environment 200 in which several of the described embodiments can be implemented. The computing environment 200 is not intended to suggest any limitation as to the scope of use or functionality of the disclosed technology, as the techniques and tools described herein can be implemented in diverse general-purpose or special-purpose environments that have computing hardware.

With reference to FIG. 2, the computing environment 200 includes at least one processing device 210 and memory 220. In FIG. 2, this most basic configuration 230 is included within a dashed line. The processing device 210 (e.g., a CPU or microprocessor) executes computer-executable instructions. In a multi-processing system, multiple processing devices execute computer-executable instructions to increase processing power. The memory 220 may be volatile memory (e.g., registers, cache, RAM, DRAM, SRAM), non-volatile memory (e.g., ROM, EEPROM, flash memory), or some combination of the two. The memory 220 stores software 280 implementing tools for generating/synthesizing/controlling any of the disclosed quantum-circuit techniques as described herein. The memory 220 can also store software 280 for synthesizing, generating, or compiling quantum circuits for implementing any of the techniques as described herein.

The computing environment can have additional features. For example, the computing environment 200 includes storage 240, one or more input devices 250, one or more output devices 260, and one or more communication connections 270. An interconnection mechanism (not shown), such as a bus, controller, or network, interconnects the components of the computing environment 200. Typically, operating system software (not shown) provides an operating environment for other software executing in the computing environment 200, and coordinates activities of the components of the computing environment 200.

The storage 240 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 200. The storage 240 can also store instructions for the software 280 implementing any of the disclosed quantum-circuit design techniques. The storage 240 can also store instructions for the software 280 for generating and/or synthesizing any of the described techniques, systems, or reversible circuits.

The input device(s) 250 can be a touch input device such as a keyboard, touchscreen, mouse, pen, trackball, a voice input device, a scanning device, or another device that provides input to the computing environment 200. The output device(s) 260 can be a display device (e.g., a computer monitor, laptop display, smartphone display, tablet display, netbook display, or touchscreen), printer, speaker, or another device that provides output from the computing environment 200.

The communication connection(s) 270 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, circuit design techniques, or compilation/synthesis techniques can be described in the general context of computer-readable instructions stored on one or more computer-readable media. Computer readable media are any available media (e.g., memory or storage device) that call be accessed within or by a computing environment. Computer-readable media include tangible computer-readable memory or storage devices, such as memory 220 and/or storage 240, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 3:
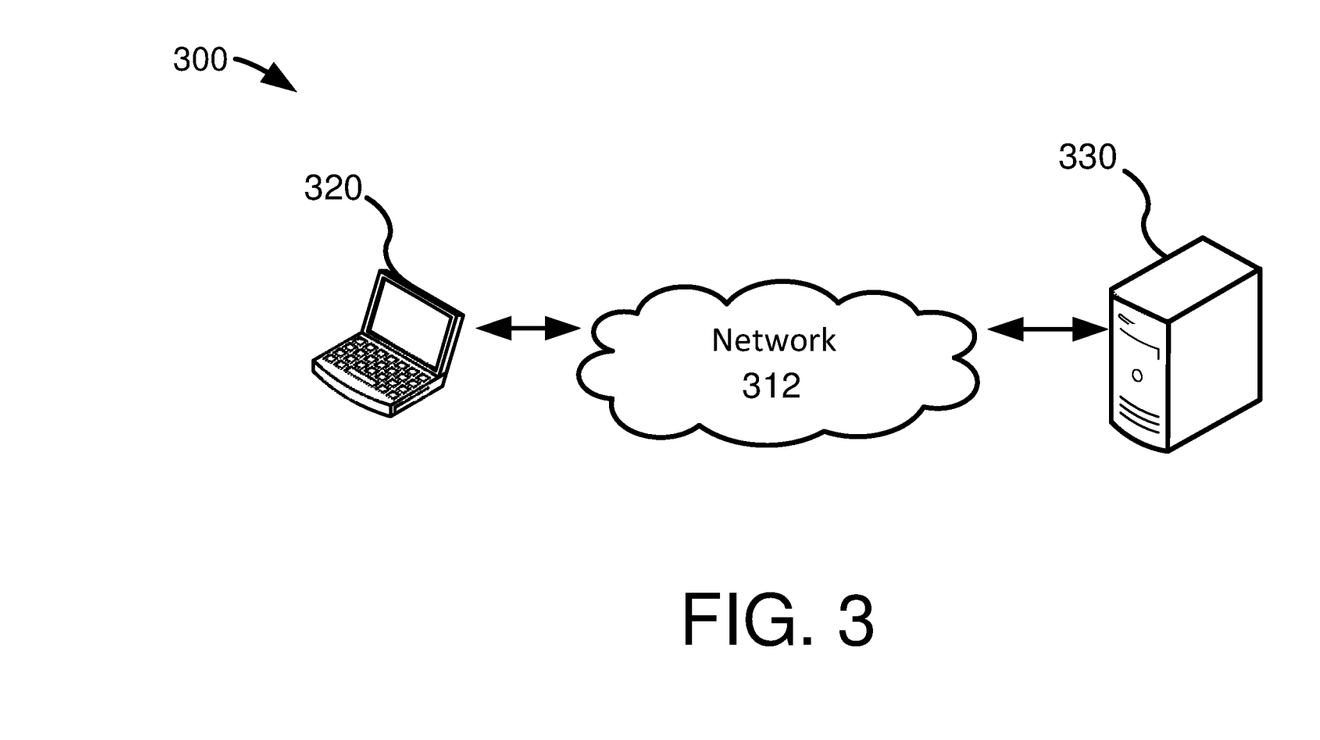
FIG. 3 is an example of a client-server network for implementing a system according to the disclosed technology.

An example of a possible network topology 300 (e.g., a client-server network) for implementing a system according to the disclosed technology is depicted in FIG. 3. Networked computing device 320 can be, for example, a computer running a browser or other software connected to a network 312. The computing device 320 can have a computer architecture as shown in FIG. 2 and discussed above. The computing device 320 is not limited to a traditional personal computer but can comprise other computing hardware configured to connect to and communicate with a network 312 (e.g., smart phones, laptop computers tablet computers, or other mobile computing devices, servers, network devices, dedicated devices, and the like). Further, the computing device 320 can comprise an FPGA or other programmable logic device. In the illustrated embodiment, the computing device 320 is configured to communicate with a computing device 330 (e.g. remote server, such as a server in a cloud computing environment via a network 312. In the illustrated embodiment, the computing device 320 is configured to transmit input data to the computing device 330, and the computing device 330 is configured to implement a technique according to any of the disclosed embodiments and/or a circuit generation or compilation/synthesis methods for generating quantum circuits based on or in conjunction with any of the techniques disclosed herein. The computing device 330 can output results to the computing device 320. Any of the data received from the computing device 330 can be stored or displayed on the computing device 320 (e.g., displayed as data on a graphical user interface or web page at the computing devices 320). In the illustrated embodiment, the illustrated network 312 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 812 can be the Internet or a similar public network and operate using an appropriate protocol (e.g., the HTTP protocol).

Figure 4:
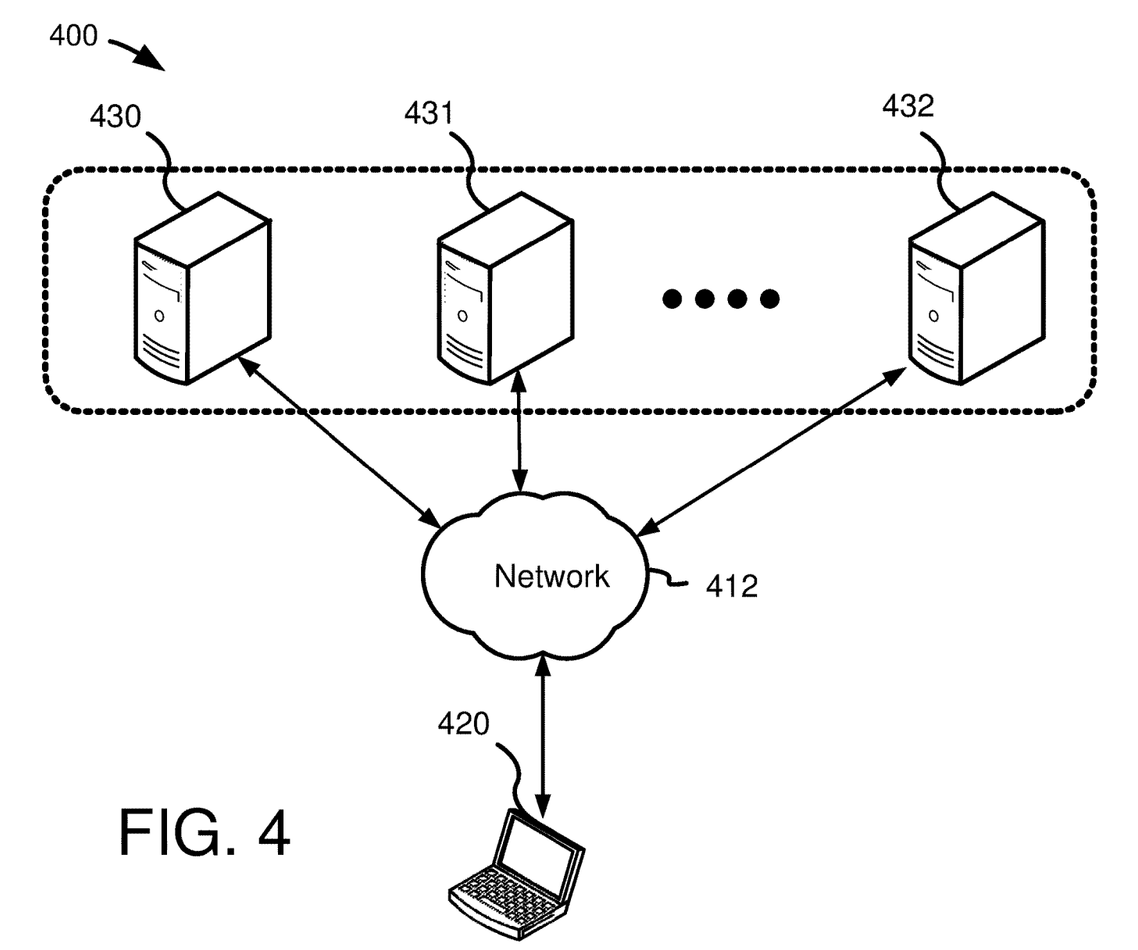
FIG. 4 is an example of a distributed computing environment for implementing a system according to the disclosed technology.

Another example of a possible network topology 400 (e.g., a distributed computing environment) for implementing a system according to the disclosed technology is depicted in FIG. 4. Networked computing device 420 can be, for example, a computer running a browser or other software connected to a network 412. The computing device 420 can have a computer architecture as shown in FIG. 2 and discussed above. In the illustrated embodiment, the computing device 420 is configured to communicate with multiple computing devices 430, 431, 432 (e.g., remote servers or other distributed computing devices, such as one or more servers in a cloud computing environment) via the network 412. In the illustrated embodiment, each of the computing devices 430, 431, 432 in the computing environment 400 is used to perform at least a portion of the disclosed processes and/or circuit generation or synthesis/compilation process. In other words, the computing devices 430, 431, 432 form a distributed computing environment in which the disclosed processes and/or generation/compilation/synthesis processes are shared across multiple computing devices. The computing device 420 is configured to transmit input data to the computing devices 430, 431, 432, which are configured to distributively implement such as process, including performance of any of the disclosed methods or creation of any of the disclosed circuits, and to provide results to the computing device 420. Any of the data received from the computing devices 430, 431, 432 can be stored or displayed on the computing device 420 (e.g., displayed as data on a graphical user interface or web page at the computing devices 420). The illustrated network 412 can be any of the networks discussed above with respect to FIG. 3.

With reference to FIG. 5, an exemplary system for implementing the disclosed technology includes computing environment 500. In computing environment 500, a compiled quantum computer circuit description (including quantum circuits for performing any of the techniques as disclosed herein) can be used to program (or configure) one or more quantum processing units such that the quantum processing unit(s) implement the circuit described by the quantum computer circuit description.

The environment 500 includes one or more quantum processing units 502 and one or more readout device(s) 508. The quantum processing unit(s) execute quantum circuits that e precompiled and described by the quantum computer circuit description. The quantum processing unit(s) can be one or more of, but are not limited to: of a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 506 at the control of quantum processor controller 520. The quantum processor controller (QP controller) 520 can operate in conjunction with a classical processor 510 (e.g., having an architecture as described above with respect to FIG. 2) to implement the desired quantum computing process. In the illustrated example, the QP controller 520 further implements the desired quantum computing process via one or more QP subcontrollers 504 that are specially adapted to control a corresponding one of the quantum processor(s) 502. For instance, in one example, the quantum controller 520 facilitates implementation of the compiled quantum circuit by sending instructions to one or more memories (e.g., lower-temperature memories), which then pass the instructions to low-temperature control unit(s) (e.g., QP subcontroller(s) 504) that transmit, for instance, pulse sequences representing the gates to the quantum processing unit(s) 502 for implementation. In other examples, the QP controller(s) 520 and QP subcontroller(s) 504 operate to provide appropriate magnetic fields, encoded operations or other such control signals to the quantum processor(s) to implement the operations of the compiled quantum computer circuit description. The quantum controller(s) can further interact with readout devices 508 to help control and implement the desired quantum computing process (e.g., by reading or measuring out data results from the quart urn processing units once available, etc.)

With reference to FIG. 5, compilation is the process of translating a high-level description of a quantum algorithm into a quantum computer circuit description comprising a sequence of quantum operations or gates, which can include the circuits as disclosed herein. The compilation can be performed by a compiler 522 using a classical processor 510 (e.g., as shown in FIG. 2) of the environment 500 which loads the high-level description from memory or storage devices 512 and stores the resulting quantum computer circuit description in the memory or storage devices 512.

In other embodiments, compilation and/or verification can be performed remotely by a remote computer 560 (e.g., a computer having a computing environment as described above with respect to FIG. 2) which stores the resulting quantum computer circuit description in one or more memory or storage devices 562 and transmits the quantum computer circuit description to the computing environment 500 for implementation in the quantum processing unit(s) 502. Still further, the remote computer 500 can store the high-level description in the memory or storage devices 562 and transmit the high-level description to the computing environment 500 for compilation and use with the quantum processor(s). In any of these scenarios, results from the computation performed by the quantum processor(s) can be communicated to the remote computer after and/or during the computation process. Still further, the remote computer can communicate with the QP controller(s) 520 such that the quantum computing process (including any compilation, verification, and QP control procedures) can be remotely controlled by the remote computer 560. In general, the remote computer 560 communicates with the QP controller(s) 520, compiler/synthesizer 522, and/or verification tool 523 via communication connections 550.

In particular embodiments, the environment 500 can be a cloud computing environment, which provides the quantum processing resources of the environment 500 to one or more remote computers (such as remote computer 560) over a suitable network (which can include the internet).

V. Concluding Remarks

We have shown that arbitrary quantum states with N coefficients specified by classical data may be prepared using a T gate complexity $\tilde{O}(\sqrt{N})$ that is an optimal square-root improvement over prior art. As the Clifford group is efficiently simulable, the 'quantumness' of a quantum algorithm is captured in part by its T gate cost. Our results show that reading classical data into a quantum algorithm is a 'classical' task that costs $\tilde{O}(N)$ Clifford gates and should be separated from the harder part of creating a superposition captured by the T gate complexity.

Having described and illustrated the principles of the disclosed technology, with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method, comprising:
inputting a quantum algorithm description in a high-level functional language to a classical computer;
with the classical computer, synthesizing the quantum algorithm description into a synthesized quantum circuit representation, wherein the quantum circuit representation is implementable on a quantum computing device, and wherein the synthesizing comprises assigning one or more ancilla qubits to be used for at least one non-Clifford operation and the ancilla qubits to be used for at least one non-Clifford operation replace at least one Toffoli-gate; and
outputting the quantum circuit representation.

2. The method of claim 1, wherein the synthesized quantum circuit representation includes a combination of both Toffoli gates and ancilla qubits to perform non-Clifford operations, the combination being determined at least in part by a user-selectable variable.

3. The method of claim 1, wherein the method reduces non-Clifford gates at a cost of greater overall ancilla qubits.

4. The method of claim 1, wherein the method is performed to synthesize arbitrary unitaries.

5. The method of claim 1, further comprising controlling a quantum computing device to implement the quantum circuit representations.

6. A method, comprising:
inputting a quantum algorithm description in a high--level functional language to a classical computer;
with the classical computer, synthesizing the quantum algorithm description into a synthesized quantum circuit representation, wherein the quantum circuit representation is implementable on a quantum computing device, and wherein the synthesizing comprises assigning one or more ancilla qubits to be used for at least one non-Clifford operation and the synthesizing comprises using a select-swap operation that enables sublinear T-gate complexity; and
outputting the quantum circuit representation.

7. The method of claim 6, wherein the select-swap operation results from a combination of a select operation and a swap network.

8. A method, comprising:
inputting a quantum algorithm description in a high-level functional language to a classical computer;
with the classical computer, synthesizing the quantum algorithm description into a synthesized quantum circuit representation, wherein the quantum circuit representation is implementable on a quantum computing device, and wherein the synthesizing comprises assigning one or more ancilla qubits to be used for at least one non-Clifford operation and the synthesizing implements a data-lookup oracle using a select-swap operation; and
outputting the quantum circuit representation.

9. One or more computer-readable memory or storage devices storing computer-executable instructions, which when executed by a classical computer cause the classical computer to perform a method of controlling a quantum computing device, the method comprising:
inputting a high-level functional language description of the quantum algorithm;
synthesizing the functional language description of the quantum algorithm into low-level machine instructions for implementation on a quantum computing device, the low-level machine instructions being implementable on the quantum computing device, and wherein the synthesizing comprises assigning one or more ancilla qubits to be used for at least one non-Clifford operation and wherein the ancilla qubits to be used for at least one non-Clifford operation replace at least one Toffoli-gate; and
controlling the quantum computing device to implement the low-level machine instructions.

10. The one or more computer-readable memory or storage devices of claim 9, wherein the synthesizing implements a data-lookup oracle using a select-swap operation.

11. The one or more computer-readable memory or storage devices of claim 9, wherein the method is performed to synthesize arbitrary unitaries.

12. The one or more computer-readable memory or storage devices of claim 9, wherein the method further comprises controlling a quantum computing device to implement the low-level machine instructions.

13. A system, comprising:
a classical computer; and
one or more computer-readable memory or storage devices storing computer-executable instructions, which when executed by the classical computer cause the classical computer to perform a method of controlling a quantum computing device, the method comprising:
inputting a high-level functional language description of the quantum algorithm;
synthesizing the high-level functional language description of the quantum algorithm into low-level machine instructions on a quantum computing device, the low-level machine instructions being implementable on the quantum computing device, and wherein the synthesizing comprises assigning one or more ancilla qubits to be used for at least one non-Clifford operation and assigning a combination of both Toffoli gates and ancilla qubits to perform non-Clifford operations, the combination being determined at least in part by a user-selectable variable.

14. The system of claim 13, wherein the method further comprises controlling the quantum computing device to implement the low-level machine instructions.

15. A system, comprising:
a classical computer; and
one or more computer-readable memory or storage devices storing computer-executable instructions, which when executed by the classical computer cause the classical computer to perform a method of controlling a quantum computing device, the method comprising:
inputting a high-level functional language description of the quantum algorithm
synthesizing the high-level functional language description of the quantum algorithm into low-level machine instructions on a quantum computing device, the low-level machine instructions being implementable on the quantum computing device, and wherein the synthesizing comprises assigning one or more ancilla qubits to be used for at least one non-Clifford operation and wherein the synthesizing comprises using a select-swap operation and the select-swap operation enables sublinear T-gate complexity; and
controlling the quantum computing device to implement the low-level machine instructions.

16. The system of claim 15, wherein the select-swap operation results from a combination of a select operation and a swap network.

17. A quantum circuit comprising a combination of Clifford and non-Clifford gates, wherein the number of non-Clifford gates is controlled by a tunable factor, wherein the tunable factor achieves a desired space-depth tradeoff for the quantum circuit and ancilla qubits used for at least one non-Clifford operation replace at least one Toffoli-gate.

* * * * *